United States Patent [19]

Momemers

[11] Patent Number: 4,523,443
[45] Date of Patent: Jun. 18, 1985

[54] KEY KEEPER

[76] Inventor: Wilhelmus M. A. Momemers, 9 Bisschop Schrijnenstraat, 6041 XK Roermond, Netherlands

[21] Appl. No.: 504,329

[22] Filed: Jun. 14, 1983

[30] Foreign Application Priority Data

Jun. 21, 1982 [NL] Netherlands ............... 8202497

[51] Int. Cl.³ .............. A44B 15/00; A47G 29/10
[52] U.S. Cl. ............................... 70/459; 24/3 K; 24/241 R
[58] Field of Search ........... 70/459, 456 R; 24/3 K, 24/241 R, 241 SL

[56] References Cited

U.S. PATENT DOCUMENTS

| 1,489,244 | 4/1924 | Gnegy | 70/459 |
| 2,694,244 | 11/1954 | Nolan | 70/459 X |
| 2,791,899 | 5/1957 | Marien | 70/459 |
| 4,079,607 | 3/1978 | Spruyt | 70/456 R |
| 4,391,113 | 7/1983 | Jorgens | 70/459 |

Primary Examiner—Gary L. Smith
Assistant Examiner—Thomas J. Dubnicka
Attorney, Agent, or Firm—Edmund M. Jaskiewicz

[57] ABSTRACT

The disclosure relates to a key keeper comprising a key-retaining loop 3 with an opening 17 for the receipt of keys; said loop is connected to a loop holder 2 being slideably mounted within a housing 1. The loop is being closed if the holder is in its slid-in position, whereas the loop can be opened if the holder is partially slid out of the housing. Means are further provided for locking the holder in its slid-in position.

The means for locking the holder consist of a wheel 4, which is rotatably mounted in the housing, the rotation of which can be prevented by a snap connection 11. By rotating the wheel 4, the loop holder is displaced in or out of the housing 1.

7 Claims, 5 Drawing Figures

KEY KEEPER

BACKGROUND OF THE INVENTION

1. Field of the Invention

The present invention relates to a key keeper comprising a key-retaining loop with an opening for the receipt of keys, said loop being connected to a loop holder slideably mounted within a housing, the loop being closed in case the holder is slid into the housing, whereas said loop can be opened in case the holder is partially slid out of the housing, means being provided to lock the holder in its slid-in position in the housing.

2. Description of the Prior Art

Key keepers of this type have been used in the art. In these known key keepers the loop and the loop holder are integrally connected and adapted to be locked in the housing by means of a snap connection in the slid-in position.

It has been found that this construction is insufficient as it often happens that the respective key keeper will arbitralily open.

SUMMARY OF THE INVENTION

It is an object of the present invention to provide a key keeper preventing an undesired opening, in a manner improved with respect to known key keepers, however without complicating the actions required for normally opening the key keeper.

This object is achieved according to the invention in that the means for locking the loop holder in the housing consist of a locking member moveably disposed in the housing and which can be locked in said housing by at least one snap connection. For opening the key keeper first the locking member has to be moved in order to disengage the loop holder and subsequently the loop holder is drawn out of the housing, whereupon the loop can be opened.

In a preferred embodiment of the present invention the loop holder is slid out of the housing by the movement of the locking member. This construction has the advantage that only one action need be performed, to wit moving the locking member, which member in turn drives the loop holder. Preferably in this embodiment the locking member consists of a wheel disposed within the housing partially protruding therefrom and being provided with an eccentric pin engaging in a groove of the loop holder. By rotating said wheel the pin will move the loop holder outside the housing, whereupon the loop can be opened.

In accordance with the invention the part of the wheel protruding outside the housing consists of a resilient tongue effecting a snap connection with the housing in the slid-in position of the loop holder. In fact said snap connection forms a first safeguard against an undesired opening of the key keeper according to the invention, a second safeguard consisting in that the wheel is provided with a second tongue disposed within the housing, said tongue cooperating with a resilient member of the loop holder to obtain an acoustic signal in case the loop holder is brought into and out of its slid-in end position. The relative movement between the wheel and the loop holder therefore causes a click both sounding by opening and closing the key keeper and warning the user, so forming an additional safeguard.

In accordance with the invention both end portions of the loop in between which the opening is formed, project into a cavity provided in the loop holder, said cavity extending transversely to the direction of movement of the holder and being provided with a slit open to the outside to laterally displace the loop, thus revealing the opening.

Preferably said cavity is substantially formed as a right-angled triangle the slit being disposed along the hypotenuse of said triangle. In case the holder is partially slid out of the housing, the movement of the loop is in this manner restricted to a single one which substantially facilitates the handling of the key keeper.

The features of the present invention which are believed to be novel are set forth with particularity in the appended claims.

Other claims and many of the attendant advantages will be more readily appreciated as the same becomes better unterstood by reference to the following detailed description and considered in connection with the accompanying drawings in which like reference symbols designate like parts throughout the figures.

DESCRIPTION OF THE PREFERRED EMBODIMENTS

Figure 1:
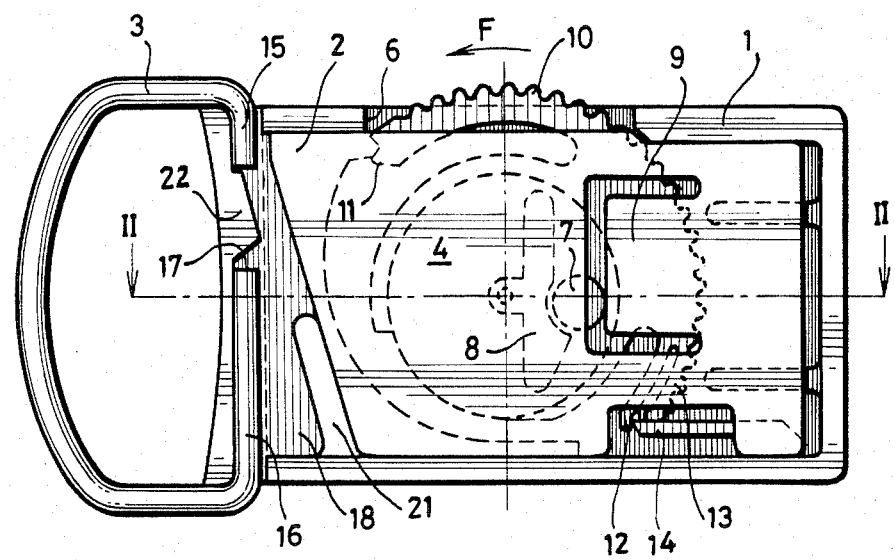
FIG. 1 is a schematic view of the key keeper according to the invention in a partially exploded form.
Figure 2:
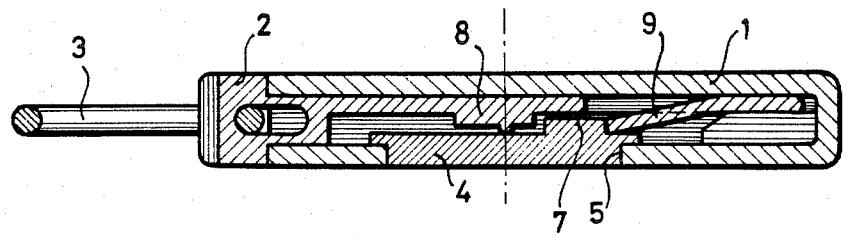
FIG. 2 is a section view according to line II-II in FIG. 1.

Particularly in FIGS. 1 and 2, the key keeper consists of a housing 1, a loop holder 2 being moveably disposed therein and a loop 3 mounted therein, as well as a wheel 4 bearing in the housing. The housing 1 has the form of a flat sleeve, one of its great flat surfaces being provided with a round aperture 5 for receiving a bearing portion of the wheel 4. One of the small longitudinal sides of the housing 1 comprises an opening 6 from which opening a control portion of the wheel 4 projects.

Wheel 4 further comprises a pin 7 disposed eccentrically with respect to the center line of its bearing portion, and engaging in a groove provided in the loop holder, the groove being formed on the one hand by a ridge 8 in the loop holder and on the other hand by a resiliently projecting part 9 of the loop holder. The arrangement of the loop holder permits same to be slid into the housing as soon as wheel 4 with its bearing portion is placed in aperture 5, the resilient projection 9 sliding across pin 7 and after having passed the same, locking loop holder 2 within the housing.

Wheel 4 is provided with a first resilient tongue 10 which partly projects through opening 6, in the closed position of the key keeper. The end of tongue 10 is provided with a V-shaped incision 11 engaging a complementary formed part of loop holder 2.

Figure 3:
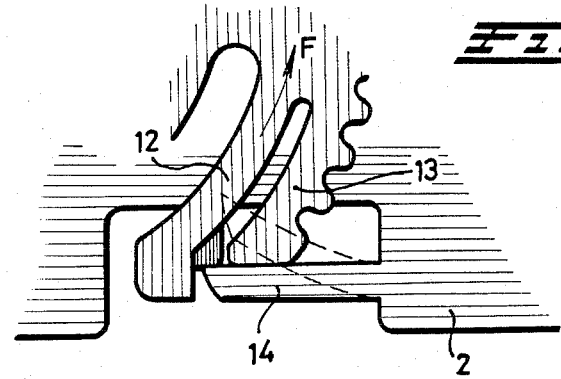
FIG. 3 is a detail of the key keeper of FIG. 1 on an enlarged scale.

Wheel 4 comprises within the housing a second resilient tongue consisting of an inner locking lip 12 and an outer lip 13 (see the detail in FIG. 3). In a closed position of the key keeper, lips 12 and 13 engage a resilient member 14 integrally connected to loop holder 2, the function of which will be explained hereinafter.

In the closed position of the key keeper (see FIG. 1), the resilient tongue 10 with its V-shaped incision 11 forms a snap connection with the loop holder 2 to prevent the rotation of the wheel 4, the lips 12 and 13 pressing the resilient member 14 downwardly (see the position as shown in FIG. 3 by full lines). The snap connection getting disengaged at 11 by pressing the resilient tongue 10 inwardly, the resilient member 14 prevents in first instance a rotary movement of wheel 4 in the direction of arrow F. However, in case of the user rotating the wheel in the direction of arrow F. the end of locking lip 12 passes the resilient member 14, thus causing an audible click. The resilient action of the resilient member will also contribute to the rotation of the wheel 4, whereupon the resilient member will obtain another position (illustrated in FIG. 3 by broken lines). It will be obvious that on closing the key keeper and rotating the wheel in the direction contrary to that of arrow F, the end of lip 12 again will pass the end of the resilient member, so that also in this case an audible click will occur.

The arrangement of lips 12 and 13 in combination with the resilient member 14 presents the advantage that the key keeper will not unintentionally be opened at a disengagement of the snap connection at 11, but that the consumer consciously has to rotate the wheel and will be warned by the click that the key keeper is going to be opened, closed respectively.

Opening the key keeper in accordance with the invention proceeds in the following manner. The user presses the tongue 10 toward the inside so that the snap connection at 11 is disengaged, subsequently the user's thumb rotates the wheel in the direction of the arrow F; the eccentric pin performs a rotating movement about the axis of opening 5 and as pin 7 is enclosed between the ridge 8 and the projecting part 9, the loop holder is moved to the left (FIG. 1), so that said loop holder projects along a certain distance outside the housing 1 after wheel 4 has been rotated over about 90°. In this position loop 3 can be displaced for the receipt of keys, as will be described hereinafter.

Loop 3 consists of an arcuate part comprising two aligned legs 15, 16 projecting into a cavity in loop holder 2 and leaving an opening 17 in between both ends of said legs (FIG. 1).

Figure 4:
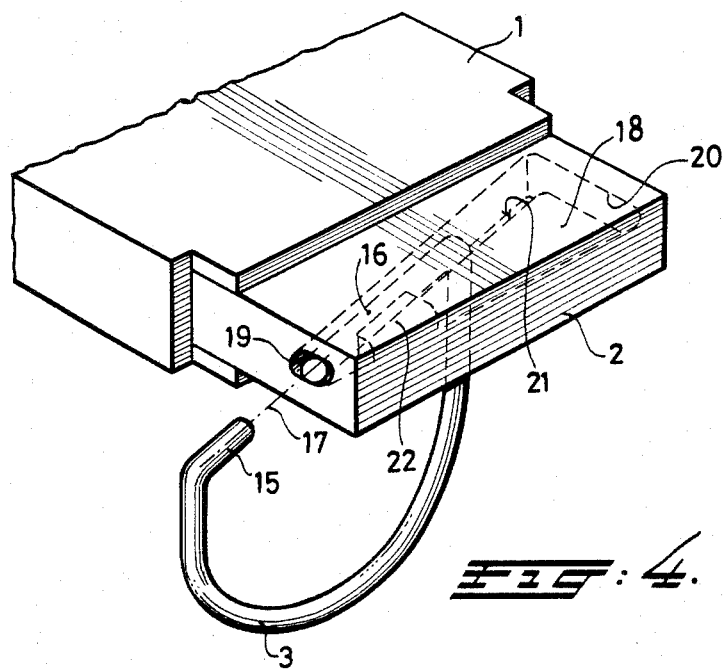
FIG. 4 is a perspective ghost view of a part of a modified embodiment of the key keeper the loop holder being in a slid-out position and the loop in the open position.

FIG. 4 is a part of the key keeper, the loop holder of which being in its slid-out position and the loop in its open position for receiving keys, disengaging keys respectively. It is clearly illustrated that the cavity 18 provided in the loop holder 2, is substantially formed as a right-angled triangle. The cavity 18 extends abroad at one lateral side of the loop holder with a small round opening 19 and at the other lateral side with a longitudinal opening 20. The cavity also comprises a slit 21 in one of the large surfaces of the loop holder the slit being directed according to the hypotenuse of said triangle and extending from one end of the opening 20 toward the inside.

To bring about the position of loop 3 as presently illustrated, from the position as illustrated in FIG. 1, after having slid out loop holder 2, said loop first has to be rotated over 90° so that the plane of the loop is perpendicular to the plane of the key keeper. Subsequently loop 3 can be turned around opening 19, that is to say that leg 16 of the loop moves toward the other end of the longitudinal opening 20 and arrives before the slit 21. Hereupon the loop can be laterally moved through slit 21 until leg 15 of said loop entirely projects outside loop holder 2 and opening 17 is revealed for being provided with keys, released from keys respectively.

The interior of cavity 18 additionally comprises a cam 22, which in a closed position of the loop, projects into opening 17 of said loop and forms an additional guide during the lateral movement of the loop.

Figure 5:
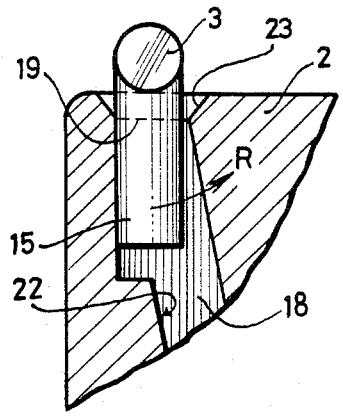
FIG. 5 is a fragmentary horizontal sectional view of a detail of the loop holder at one lateral end of the cavity in which the loop is arranged.

FIG. 5 illustrates on an enlarged scale, one lateral end of cavity 18 situated near opening 19; it is obvious that opening 19 comprises a hopper-shaped widening 23 which enables the pivotal movement of leg 15 in the direction of arrow R for opening the loop. The form of cavity 18 offers the advantage that there is only one possibility for the displacement of loop 3 at a slid-out position of loop holder 2, to wit rotating about opening 19, causing leg 16 to automatically arrive before slit 21, so that the loop can be opened.

From the features as described above it will be apparent that the key keeper according to the invention comprises a great number of safeguards preventing an undesired opening of the key keeper, although the key keeper can be handled and used in a very simple manner.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. Key keeper comprising: a key-retaining loop with an opening for the receipt of keys, said loop being connected to a loop holder slideably mounted within a housing, the loop being closed in case the holder is slid into the housing, whereas said loop can be opened in case the holder is partially slid out of the housing, means for locking the holder in its slid-in position in the housing, the locking means comprising a locking member moveably disposed in the housing and which can be locked in said housing by at lease one snap connection, and means operatively connecting said loop holder and said locking member for sliding movement of said loop holder out of said housing upon movement of said locking member.

2. Key keeper as claimed in claim 1, in which the locking member consists of a wheel disposed with the housing partially protruding therefrom and being provided with an eccentric pin engaging in a groove of the loop holder.

3. Key keeper as claimed in claim 2, in which the part of the wheel protruding outside the housing consists of a resilient tongue effecting a snap connection with the housing in the slid-in position of the loop holder.

4. Key keeper as claimed in claim 3, in which the wheel is provided with a second tongue disposed within the housing, said tongue cooperating with a resilient member of the loop holder to obtain an acoustic signal in case the loop holder is brought into or out of its slid-in end position.

5. Key keeper as claimed in claim 2, in which the wheel comprises a pin disposed eccentrically with respect to the center line of its bearing portion, engaging in a groove provided in the loop holder and being formed on the one hand by a ridge in the loop holder and on the other hand by a resiliently projecting part of the loop holder.

6. Key keeper as claimed in claim 1, wherein both end parts of the loop adjacent to the opening project into a cavity provided in the loop holder, said cavity extending transversely to the direction of movement of the holder and being provided with a slit open at the outside to laterally displace the loop, for revealing the opening.

7. Key keeper as claimed in claim 6, in which the cavity is substantially formed as a right-angled triangle the slit being adapted according to the hypotenuse of said triangle.

* * * * *

UNITED STATES PATENT OFFICE
CERTIFICATE OF CORRECTION

PATENT NO. : 4,523,443

DATED : June 18, 1985

INVENTOR(S) : Wilhelmus M.A. Mommers

It is certified that error appears in the above-identified patent and that said Letters Patent are hereby corrected as shown below:

The surname of the patentee should read as follows:

Mommers

[76] Inventor: Wilhelmus M.A. Mommers

Signed and Sealed this

Fifteenth Day of October 1985

[SEAL]

Attest:

Attesting Officer

DONALD J. QUIGG

Commissioner of Patents and
Trademarks—Designate